C. WILLIAMS AND J. A. YOUNG.
MILKING MACHINE TEAT CUP CLAW.
APPLICATION FILED APR. 7, 1920.

1,358,667.  
Patented Nov. 9, 1920.

Inventors  
C. Williams  
J. A. Young  
By H. R. Kerslake  
Attorney

ND PATENT OFFICE.

CHARLES WILLIAMS AND JAMES ALEXANDER YOUNG, OF AUCKLAND, NEW ZEALAND.

MILKING-MACHINE TEAT-CUP CLAW.

1,358,667.  Specification of Letters Patent.  Patented Nov. 9, 1920.

Application filed April 7, 1920. Serial No. 371,971.

*To all whom it may concern:*

Be it known that we, CHARLES WILLIAMS and JAMES ALEXANDER YOUNG, citizens of the Dominion of New Zealand, of 19-21 Lorne street, Auckland, New Zealand, have invented certain new and useful Improvements in Milking-Machine Teat-Cup Claws, of which the following is a specification.

This invention relates to the teat cup claws of milking machines and provides an improvement in claws, whereby the admission of air to the milk and vacuum pipes and connections of the machine is automatically prevented, on a teat cup or cups, falling off or becoming dislodged from the teat or teats of an animal during milking operations.

According to the invention the cross tubes or connections of each claw, with which the milk spaces of the teat cups are in communication, are provided at each end with a plug cock, having a handle in the form of a nipple.

The flexible connections from the milk spaces of the cups are connected to the cock handles, the latter each being formed with a passage therethrough which enters a port in the plug.

When placing the teat cups on an animal at the commencement of milking operations, the plugs and handles of the cocks are turned so that milk can be drawn from the milk spaces of the cups into the milk tubes of the claw.

Should a teat cup fall off or be dislodged from a teat, the weight of the falling cup owing to its connection to a cock handle, causes the cock plug to turn and close the cross milk and vacuum tube at the end connected to the dislodged cup, the result of which is that the admission of air to the milk and vacuum pipes of the machine is prevented, and the vacuum therein is not broken down or reduced, thereby enabling the other teat cups to remain in position on the teats and milking operations to continue without interruption.

Referring to the accompanying drawing, in conjunction with which the invention will be more fully described:

Figure 1:
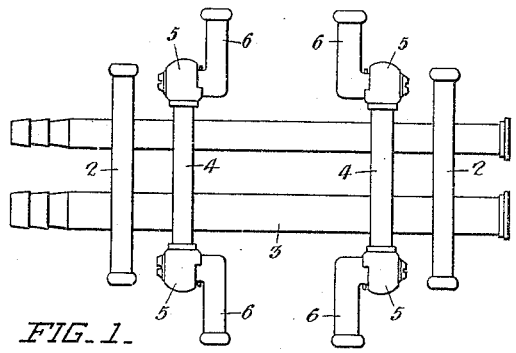
Figure 1 is a plan view of a claw constructed according to the invention.
Figure 2:
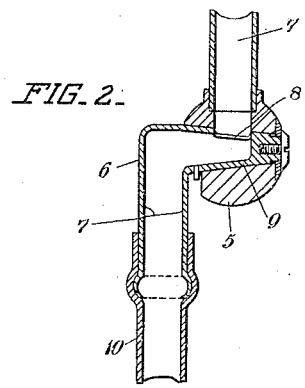
Fig. 2 is a sectional plan view of one end of a cross vacuum and milk tube or connection and a cock fitted thereto.
Figures 3, 4:
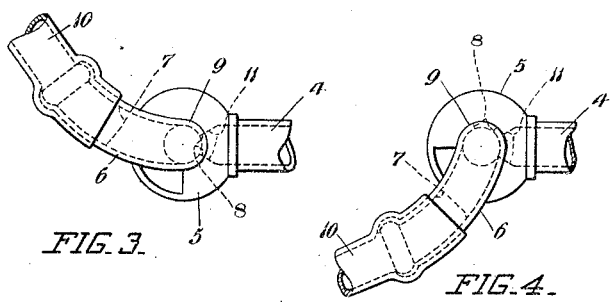
Figs. 3 and 4 are part elevations of a cross milk and vacuum tube or connection, showing a cock in the "on" and "off" positions respectively.

The claw consists of the usual main vacuum tube adapted to be connected with the inflator spaces of the teat cups through the cross tubes or connections 2, and the usual main milk and vacuum tube 3 adapted to be connected with the milk spaces of the teat cups through the cross tubes or connections 4.

The milk and vacuum cross tubes 4 are fitted at both ends with cocks 5, the latter having handles in the form of nipples and containing passages 7 which enter ports 8 in the plugs 9.

The flexible connections 10 from the milk spaces of the teat cups are connected to the handles 6, and when placing the cups on the teats at the commencement of milking operations, the handles 6 and plugs 9 are turned so that milk drawn from the teat, can pass from the flexible connections 10 to the tubes 4, via the the passages 7 ports 8 and ports 11 in the cock bodies. The flexible connections from the inflator spaces of the teat cups are made to the tubes 2 in the usual way.

Should by any chance, a teat cup fall off a teat, it will in falling owing to its connection to a cock handle 6 cause the plug 9 of the cock to turn and close the port 11 leading to the tube 4, thereby closing the latter at the end connected to the dislodged cup, and preventing the admission of air to the milk and vacuum pipes and connections of the machines, which enables the vacuum of the plant to be maintained at the degree necessary to enable milking operations to continue.

What we claim and desire to secure by Letters Patent of the United States is:—

1. A milking machine teat cup claw, comprising a main vacuum tube in communication with cross vacuum tubes; a main milk and vacuum tube in communication with cross, milk and vacuum tubes; plug cocks at the ends of said cross, milk and vacuum tubes and each having, a port opening into one end of said cross, milk and vacuum tubes, a port in the plug, and a passage through the handle, entering the port in the plug.

2. In a milking machine teat cup claw, a cross, milk and vacuum tube in communication with the main milk and vacuum tube of the claw; a plug cock fitted on the end of said tube, and containing a port through its body, opening into said cross tube; a port in the plug adapted to be brought opposite the port in said body; a handle in the form of a nipple to take a flexible tube; and a passage through said handle, entering the port in the plug.

In testimony whereof we have signed our names to this specification in the presence of two witnesses.

CHARLES WILLIAMS.
JAMES ALEXANDER YOUNG.

Witnesses:
WILLIAM PORICHES,
MARY PIKINGTON.